(12) United States Patent
Yoo et al.

(10) Patent No.: US 6,212,154 B1
(45) Date of Patent: Apr. 3, 2001

(54) OPTICAL PICKUP FOR OPTICAL DISK AND LIGHT SOURCE FOR OPTICAL PICKUP

(75) Inventors: Jang-hoon Yoo; Chul-woo Lee, both of Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/095,126

(22) Filed: Jun. 10, 1998

(30) Foreign Application Priority Data

Oct. 8, 1997 (KR) .................................................. 97-51661

(51) Int. Cl.[7] .......................................................... G11B 7/00
(52) U.S. Cl. ........................ 369/118; 369/112; 369/44.24
(58) Field of Search .................................. 369/112, 103, 369/109, 118, 44.12, 44.23, 44.24

(56) References Cited

U.S. PATENT DOCUMENTS

| | | | |
|---|---|---|---|
| 2,238,735 | * 4/1941 | Hullegard | 369/119 |
| 3,295,142 | * 12/1966 | Slaven | 369/119 |
| 3,716,286 | * 2/1973 | St John et al. | 369/103 |
| 3,736,046 | * 5/1973 | Zook | 369/118 |
| 3,980,818 | * 9/1976 | Browning | 369/119 |
| 4,115,809 | * 9/1978 | Ueno | 369/118 |
| 5,400,314 | 3/1995 | Lee | 369/121 |
| 5,625,613 | * 4/1997 | Kato et al. | 369/118 |

FOREIGN PATENT DOCUMENTS

WO 96/27143     9/1996     (WO).

* cited by examiner

Primary Examiner—Nabil Hindi
(74) Attorney, Agent, or Firm—Staas & Halsey LLP

(57) ABSTRACT

An optical pickup using a light-emitting diode (LED), which is capable of forming a light spot of an appropriate size for high-density recording/reproduction. The optical pickup includes a light-emitting diode (LED) to generate and emit light; a condensing unit to condense the light emitted from the LED; an optical filter to selectively transmit a predetermined wavelength of the light emitted from the LED; a spatial filter having a pin-hole, to limit a transmission range of the light condensed by the condensing unit; and a collimating lens to condense the divergent light passed through the spatial filter to form a parallel light. The parallel light is directed by a beam splitter toward an objective lens which focuses the parallel light on an optical disk. The light reflected from the optical disk is received by a photodetector.

23 Claims, 3 Drawing Sheets

OPTICAL PICKUP FOR OPTICAL DISK AND LIGHT SOURCE FOR OPTICAL PICKUP

BACKGROUND OF THE INVENTION

1. Field of the Invention

The present invention relates to an optical pickup capable of recording information on or reproducing information from an optical recording medium, and more particularly, to an optical pickup adopting a light-emitting diode (LED) capable of forming a light spot of an appropriate size for a high-density recording/reproduction.

2. Description of the Related Art

In general, in an optical recording/reproduction field of technology, an optical disk such as a laser disk (LD), a compact disk (CD) or a digital versatile disk (DVD) has been focused on as an optical recording medium capable of recording a large amount of information. In particular, the DVD has been highlighted due to its large scale information processing capability. In order to increase the recording density of the DVD, it is necessary to minimize the size of the light spot formed on the recording surface of the DVD.

Referring to FIG. 1, a conventional optical pickup includes a light source 11 for generating/emitting a laser beam, a beam splitter 13 for converting the traveling path of the incident light, an objective lens 14 for condensing the light emitted from the light source 11 via the beam splitter 13, and a photodetector 16 for receiving the light incident via the beam splitter 13 after being reflected from an optical disk 1. The light source 11 is a semiconductor laser for generating and emitting the laser beam. The photodetector 16 receives the light reflected from the optical disk 1 and performs a photoelectric conversion to detect a radio frequency (RF) signal, a tracking error signal and a focus error signal.

A collimating lens 12 is provided between the light source 11 and the beam splitter 13, which collimates the divergent light emitted from the light source 11. Also, a light reception lens 15 is arranged between the beam splitter 13 and the photodetector 16, which causes astigmatism so that a focus error signal can be detected.

As described above, when forming a light spot on the optical disk 1 using an optical pickup having the above structure, the size of the light spot is determined by the following equation (1).

$$\text{size of light spot} = \frac{\lambda}{NA}$$

where $\lambda$ represents the wavelength of the light source 11 of the optical pickup, and NA represents the numerical aperture of the objective lens 14 of the optical pickup.

Thus, if the objective lens 14 of the optical pickup has a predetermined numerical aperture, a shorter wavelength of the light emitted from the light source 11 will form a smaller light spot. On the other hand, since the light source 11 is a semiconductor laser, it is difficult for the wavelength of the light to be approximately 635 nm. Thus, if the numerical aperture of the objective lens is 0.6, the size of the light spot formed on the optical disk is approximately 1.08 μm based on the equation (1). Thus, it is difficult to record optical information of 5 gigabytes or more on an optical disk having a diameter of 130 mm.

SUMMARY OF THE INVENTION

To solve the above problems, it is an object of the present invention to provide an optical pickup capable of recording/reproducing a large amount of information by adopting a light-emitting diode (LED), instead of a semiconductor laser.

Additional objects and advantages of the invention will be set forth in part in the description which follows and, in part, will be obvious from the description, or may be learned by practice of the invention.

To achieve the above and other objects of the present invention, there is provided an optical pickup including a light-emitting diode (LED) to generate and emit light; a condensing unit to condense the light emitted from the LED; an optical filter to selectively transmit a predetermined wavelength of the light emitted from the LED; a spatial filter having a pin-hole, to limit the transmission range of the light condensed by the condensing unit; and a collimating lens to condense the divergent light passed through the spatial filter.

Preferably, the LED generates light having a wavelength of approximately 600 nm or less.

BRIEF DESCRIPTION OF THE DRAWINGS

The above and other objects and advantages of the present invention will become more apparent by describing in detail a preferred embodiment thereof with reference to the attached drawings, in which.

DESCRIPTION OF THE PREFERRED EMBODIMENTS

Figure 1:
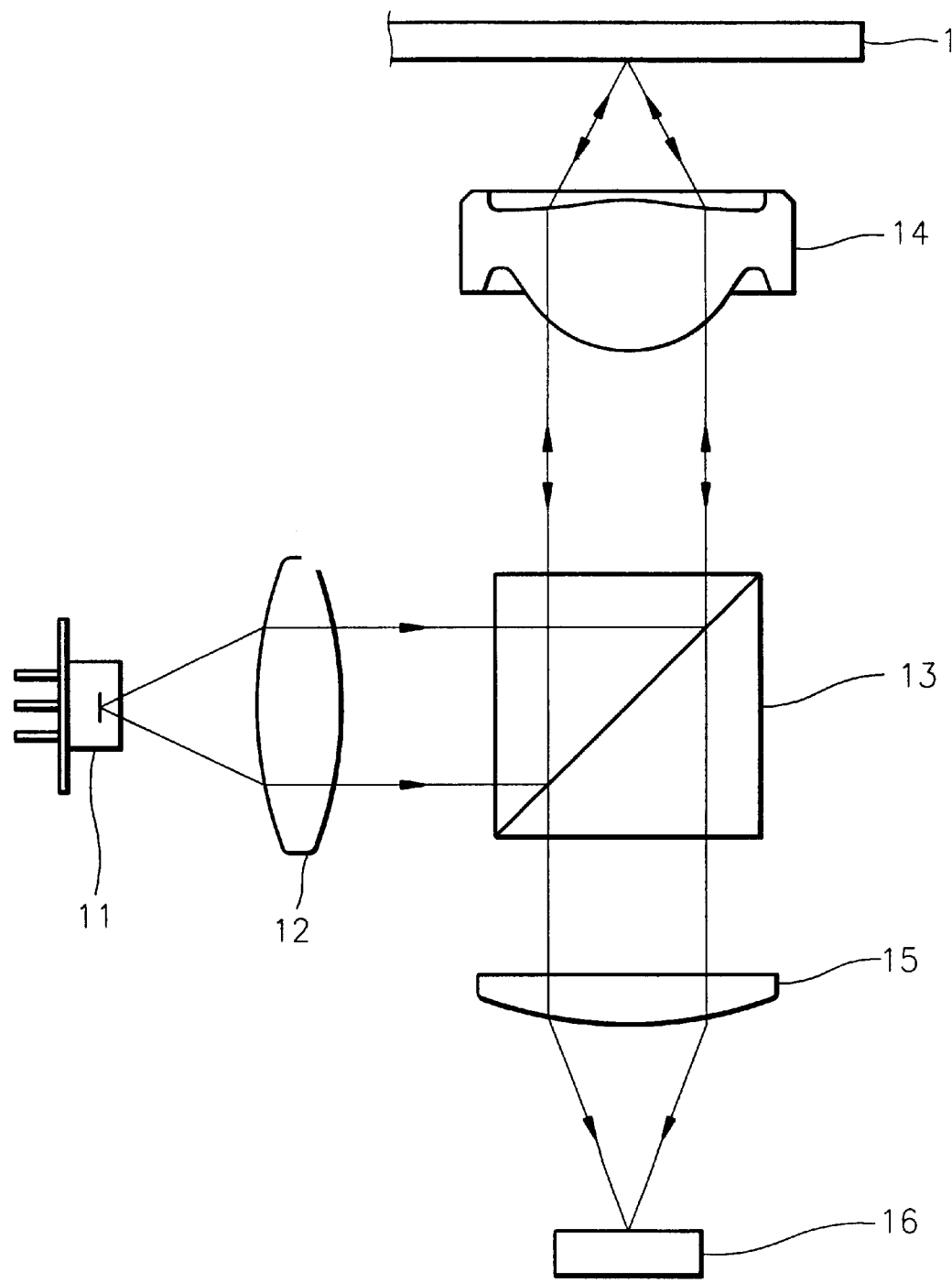
FIG. 1 is a schematic diagram showing an optical arrangement of a conventional optical pickup.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
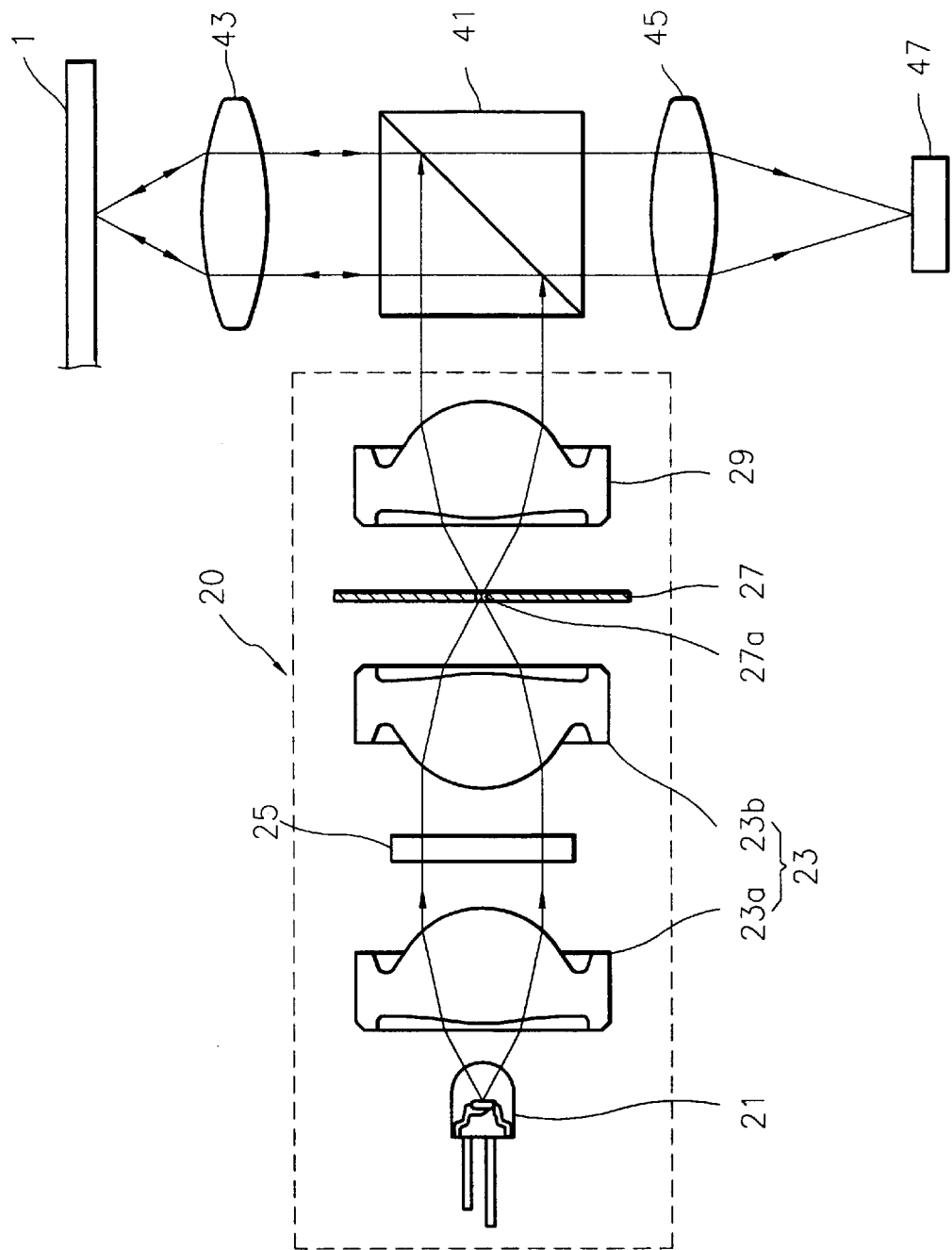
FIG. 2 is a schematic diagram showing an optical arrangement of an optical pickup according to a first embodiment of the present invention.
Figure 3:
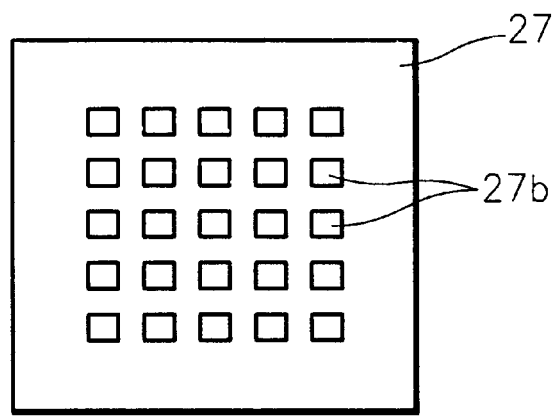
FIG. 3 is a schematic front view of a spatial filter shown in FIG. 2.

Referring to FIGS. 2 and 3, an optical pickup according to a first embodiment of the present invention includes a light source unit 20, light path changing means (beam splitter 41 in this instance) for changing a traveling path of an incident light, an objective lens 43 to condense the incident light to form a light spot on an optical recording medium 1, and a photodetector 47 to receive light reflected by the light path changing means after being reflected from the optical recording medium 1.

According to the present invention, the structure of the light source unit 20 is improved such that a short wavelength light is irradiated for a high-density recording/reproduction of an optical recording medium.

The light source unit 20 of the optical pickup according to the first embodiment of the present invention includes a light-emitting diode (LED) 21, a condensing unit 23 to condense the incident light, an optical filter 25 to selectively transmit a predetermined wavelength of light, a spatial filter 27 to limit the transmission range of the light condensed by the condensing unit 23, and a collimating lens 29 to condense the divergent light passed through the spatial filter 27.

The LED 21, as a semiconductor device emitting light through application of power, is formed of gallium arsenide (GaAs) or by adding impurities such as phosphorous (P) and aluminum (Al) to GaAs. The LED 21 emits light of 400~700 nm according to the content of the impurities.

The above first embodiment of the present invention is for achieving high-density recording/reproduction on an optical recording medium 1. Here, preferably, the optical pickup of the present embodiment adopts an LED 21 for emitting light having a wavelength of approximately 600 nm or less. The structure of the LED 21, is well known, and thus an explanation of the LED 21 will be omitted.

The condensing unit 23 includes a first condensing lens 23a and a second condensing lens 23b. The first condensing lens 23a, which is arranged in an optical path between the LED 21 and the optical filter 25, condenses the divergent light incident from the LED 21 into a parallel light. The second condensing lens 23b, which is arranged in an optical path between the optical filter 25 and the spatial filter 27, condenses the incident parallel light to form a light spot on the spatial filter 27.

The optical filter 25 selectively transmits a predetermined wavelength of light irradiated from the LED 21 and condensed by the first condensing lens 23a, in order to form a single wavelength of light on the optical recording medium 1.

The spatial filter 27 has a pin-hole 27a which limits the transmission range of the light condensed by the condensing unit 23.

Also, the spatial filter 27 may include a plurality of pin-holes 27b in consideration of the light efficiency in its use, as shown in FIG. 3. If the spatial filter 27 has several pin-holes 27b, aberrations are corrected by each pin-hole 27b, so that a plurality of divergent lights with little aberration can be obtained, and the light efficiency can be markedly increased. Here, if the interval between the pin-holes 27b is relatively shorter than the focal length of the collimating lens 29, interference caused by the interval between the pin-holes 27b is negligible.

The collimating lens 29 collimates the divergent light passed through the spatial filter 27.

Thus, the divergent light emitted from the LED 21 is changed into a parallel light by the first condensing lens 23a, and the optical filter 25 selectively transmits a predetermined wavelength of light. The light passed through the optical filter 25 is condensed onto the spatial filter 27 by the second condensing lens 23b. The condensed light from the second condensing lens 23b passes through the pin-hole 27a, and the divergent light passed through the pin-hole 27a is changed into a parallel light after being passed through the collimating lens 29.

The light path changing means, e.g., the beam splitter 41, reflects and transmits light. Here, the light from the light source 20 is reflected by the beam splitter 41 and proceeds toward the optical recording medium 1, and then is focused onto the optical recording medium 1 by the objective lens 43. The light reflected from the optical recording medium 1 passes through the objective lens 43 and the beam splitter 41 and is condensed onto the photodetector 47 via a light reception lens 45.

Figure 4:
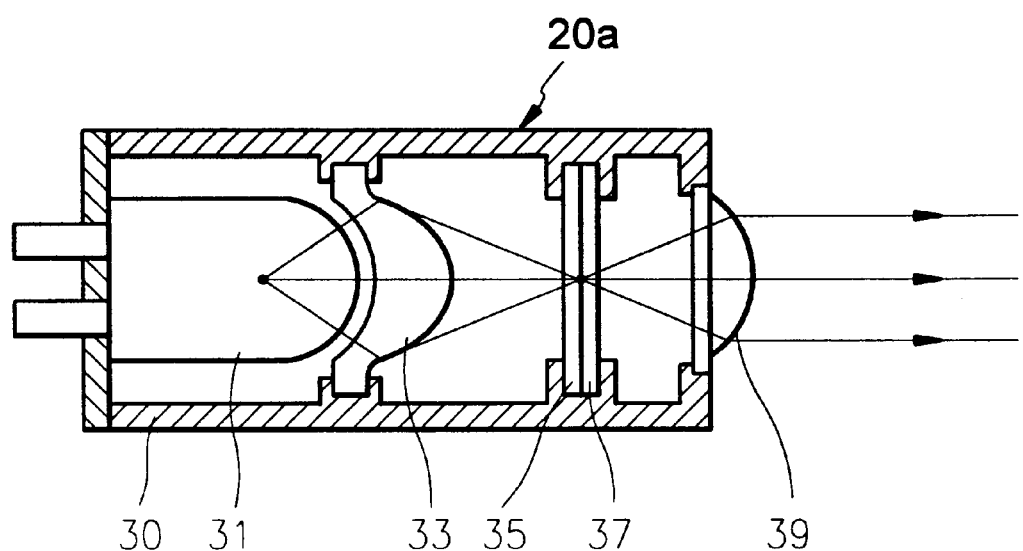
FIG. 4 is a schematic view showing the optical arrangement of a light source unit of an optical pickup according to a second embodiment of the present invention.

Referring to FIG. 4, a light source unit 20a of an optical pickup according to a second embodiment of the present invention includes an LED 31, a condensing lens 33 to condense the incident light from the LED 31, an optical filter 35 to selectively transmit a predetermined wavelength of the light condensed by the condensing lens 33, a spatial filter 37 to limit the transmission range of the light condensed by the condensing lens 33, and a collimating lens 39 to condense the divergent light passed through the spatial filter 37 into parallel light. Here, the light source unit 20a is installed as a single module within a housing 30.

The LED 31 and the collimating lens 39 are substantially the same as the LED 21 and the collimating lens 29, respectively, which were explained with reference to FIG. 2, and thus an explanation thereof will be omitted.

On the other hand, the condensing lens 33 of FIG. 4 is arranged on the optical path between the LED 30 and the optical filter 35, and condenses the divergent light incident from the LED 31 onto the spatial filter 37.

The optical filter 35 selectively transmits only a predetermined wavelength of light incident via the condensing lens 33 after being emitted from the LED 31. Also, the spatial filter 37 has one or several pin-holes (not shown) to limit the transmission range of the incident light from the optical filter 35, thereby correcting aberrations. Preferably, the optical filter 35 and the spatial filter 37 are coupled to each other to minimize the size of the light source unit 20a.

If the light source unit 20a is constructed as shown in FIG. 4, a parallel light with a short wavelength of 600 nm or less can be emitted, and the structure thereof can be made compact.

The optical pickup having the above structures uses light of 600 nm or less, so that a high-density recording/reproduction of 15 gigabytes or more can be achieved. Also, the optical pickup can be made compact by adopting the module-type light source unit.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup comprising:
   a light-emitting diode (LED) to generate and emit light;
   a condensing unit to condense the light emitted from the LED;
   an optical filter to selectively transmit a predetermined wavelength of the light emitted from the LED;
   a spatial filter having a plurality of pin-holes, to limit the transmission range of the light condensed by the condensing unit and selectively transmitted by the optical filter, to emit a divergent light, and to correct aberrations of the divergent light; and
   a collimating lens to condense the divergent light emitted from the spatial filter.

2. The optical pickup of claim 1, wherein the light generated and emitted by the LED has a wavelength of approximately 600 nm or less.

3. The optical pickup of claim 1, wherein the condensing unit comprises:
   a first condensing lens arranged on an optical path between the LED and the optical filter, to condense the light incident from the LED into a parallel light; and
   a second condensing lens arranged on an optical path between the optical filter and the spatial filter, to condense the incident parallel light selectively transmitted from the pinholes of the spatial filter.

4. The optical pickup of claim 1, wherein the optical filter and the spatial filter are coupled to each other.

5. The optical pickup of claim 4, wherein the condensing unit is arranged on the optical path between the LED and the optical filter, to condense the light incident from the LED through the optical filter and onto the spatial filter.

6. An optical pickup to at least one of reproduce and record data on and from an optical disk, comprising:
   a light-emitting diode (LED) to generate and emit a light;
   a light shaping unit to selectively transmit and collimate a predetermined wavelength of the emitted light, said light shaping unit including a spatial filter having a plurality of pin-holes to correct an aberration of light; and
   a focusing lens to focus the collimated light on the optical disk.

7. The optical pickup as claimed in claim 6, wherein the light emitted from said LED has a wavelength of 600 nm or less.

8. The optical pickup as claimed in claim 6, wherein said light shaping unit further comprises:
   a first condensing lens to condense the light emitted from said LED, to generate a first condensed light;
   an optical filter to selectively transmit the predetermined wavelength of the first condensed light, to generate a first filtered light;
   a second condensing lens to condense the first filtered light, to generate a second condensed light, said spatial filter limiting a transmission range of said second condensed light, to generate a second filtered light as divergent light; and
   a collimating lens to collimate the second filtered light, to generate the focused light.

9. The optical pickup as claimed in claim 8, wherein said collimating lens has a focal length, and each interval between adjacent ones of the plurality of pin holes is shorter than the focal length of said collimating lens.

10. The optical pickup as claimed in claim 8, wherein said first condensing lens generates said first condensed light as a parallel light.

11. The optical pickup as claimed in claim 6, further comprising:
    a beam splitter to direct the collimated light toward said focusing lens which is an objective lens; and
    a photodetector to detect the focused light reflected from the optical disk and which passes through said objective lens and directed by said beam splitter toward said photodetector.

12. An optical pickup to at least one of reproduce and record data on and from an optical disk, comprising:
    a light-emitting diode (LED) to generate and emit a light;
    a condensing lens to condense the light emitted from said LED, to generate a condensed light;
    an optical filter to selectively transmit the predetermined wavelength of the condensed light, to generate a first filtered light;
    a second filter having a plurality of pin holes to limit a transmission range of said first filtered light, to generate a second filtered light as divergent light, said plurality of pin-holes correcting an aberration of the divergent light;
    a collimating lens to collimate the second filtered light, to generate the focused light; and
    a focusing lens to focus the collimated light on the optical disk.

13. The optical pickup as claimed in claim 12, wherein said collimating lens has a focal length, and each interval between adjacent ones of the plurality of pin holes is shorter than the focal length of said collimating lens.

14. The optical pickup as claimed in claim 12, further comprising a housing having a single module which houses said LED, condensing lens, optical filter, second filter, and collimating lens.

15. The optical pickup as claimed in claim 12, wherein said second filter is coupled to said optical filter.

16. The optical pickup as claimed in claim 12, further comprising:
    a beam splitter to direct the collimated light toward said focusing lens which is an objective lens; and
    a photodetector to detect the focused light reflected from the optical disk and which passes through said objective lens and directed by said beam splitter toward said photodetector.

17. The optical pickup as claimed in claim 12, wherein said condensing lens generates said condensed light as a converging light.

18. An optical pickup to at least one of reproduce and record data on and from an optical disk, comprising:
    a light-emitting diode (LED) to generate and emit a divergent light;
    a light shaping unit to condense and selectively transmit a predetermined wavelength of the emitted light, said light shaping unit including a spatial filter having a plurality of pin-holes to correct an aberration of light; and
    a focusing lens to focus the light of the predetermined frequency on the optical disk.

19. A light source module for an optical pickup comprising:
    a light-emitting diode (LED) which emits light;
    a condensing unit which condenses the emitted light;
    an optical filter which selectively transmits a predetermined wavelength of the emitted light;
    a spatial filter, having a plurality of pin-holes, which limits a transmission range of the light selectively transmitted by the optical filter and which transmits a divergent light;
    a collimating lens which condenses the divergent light transmitted by the spatial filter; and
    a housing which retains the light emitting diode, the condensing unit, the optical filter, the spatial filter and the collimating lens in a fixed relationship.

20. The integrated light source as claimed in claim 19, wherein the optical filter and the spatial filter are adjacently located in said housing.

21. The integrated light source as claimed in claim 19, wherein an interval between adjacent pin-holes of said plurality of pin-holes is less than a focal length of the collimating lens.

22. The integrated light source as claimed in claim 19, wherein the wavelength of light emitted from the light emitting diode is less than or equal to 600 nm.

23. The integrated light source as claimed in claim 19, wherein the wavelength of the light selectively transmitted by the optical filter is less than or equal to 600 nm.

* * * * *